March 27, 1973  D. B. CARSON ET AL  3,723,300
FLUID CONTACTING METHOD FOR FLUID-SOLID CONTACTING
Original Filed June 23, 1969  3 Sheets-Sheet 1

INVENTORS:
Don B. Carson
William R. Hennemuth

BY: *James R. Hoatson, Jr.*
*Edward W. Remus*
ATTORNEYS

March 27, 1973    D. B. CARSON ET AL    3,723,300
FLUID CONTACTING METHOD FOR FLUID-SOLID CONTACTING
Original Filed June 23, 1969    3 Sheets-Sheet 2

INVENTORS:
Don B. Carson
William R. Hennemuth

BY: *James R. Hoatson, Jr.*
*Edward W. Remus*
ATTORNEYS

INVENTORS:
Don B. Carson
William R. Hennemuth
BY: James R. Hoatson, Jr.
Edward W. Remus
ATTORNEYS

United States Patent Office 3,723,300
Patented Mar. 27, 1973

3,723,300
FLUID CONTACTING METHOD FOR FLUID-SOLID CONTACTING
Don B. Carson and William R. Hennemuth, Mount Prospect, Ill., assignors to Universal Oil Products Company, Des Plaines, Ill.
Original application June 23, 1969, Ser. No. 835,449. Divided and this application Mar. 12, 1971, Ser. No. 123,641
Int. Cl. C10g 13/00
U.S. Cl. 208—146                                        11 Claims

ABSTRACT OF THE DISCLOSURE

Method for contacting two fluids in a fluid-solids contacting zone, such as an adsorption zone or a reaction zone. A first fluid is passed into a central chamber having a plurality of fluid openings in the chamber wall, while a second fluid is passed into a solids free annular chamber encompassing the central chamber and spaced apart therefrom. The second fluid is discharged via fluid openings in the inner annular chamber wall, into an annular space between the chambers, and the first fluid is discharged from the central chamber into the second fluid discharge. The fluid openings through which the first fluid is introduced into the annular space between the chambers are in substantially axial radial alignment with the fluid openings through which the second fluid is introduced, thereby providing a region of high turbulence for mixing the first and second fluids. A resulting fluid mixture is passed from the annular space into a second central chamber for further mixing and then to a bed of particulated contact solids. Specific application is in hydrogenation, hydrotreating, hydrocracking and hydrodealkylation reactions.

CROSS-REFERENCE TO RELATED APPLICATION

This application is a division of our co-pending application, Ser. No. 835,449, filed June 23, 1969, now Pat. No. 3,598,541, the teachings of which are specifically incorporated herein.

BACKGROUND OF THE INVENTION

The present invention relates to a method for contacting two fluids in a fluid-solids contacting zone such as an adsorption zone or a reaction zone. More particularly, the invention is directed to the contacting of two fluids comprising a liquid phase and a vapor phase in a fluid-solids contacting zone, and to methods for effecting improved heat exchange between the vapor and liquid phases in a contacting vessel. More specifically, the invention relates to a new and improved method for uniformly distributing mixed phases of vapor and liquid to a granular or particulated solid contacting zone, as in an adsorption tower or as in a catalytic reactor such as a hydrogenation, hydrotreating, hydrocracking, or a hydrodealkylation reactor.

Among the most important of the various commercial processes are those involving the physical or chemical treatment of hydrocarbons and other organic materials with bodies of granular or particulated solid contact materials. Many of these processes involve the contacting of two fluids with the contacting material, and most often, the two fluids will comprise a liquid phase and a gas or vapor phase. It has been the experience in the art, that the introduction of mixtures of liquid and vapor into a bed of particulated contact solids, in a uniformly distributed manner, is difficult to achieve.

Typical of the art wherein uniform distribution of liquid and gas phases is necessary, but infrequently achieved, is that of catalytic hydrotreating and catalytic hydrocracking of various hydrocarbon oils. It is well known that the feed to such a reaction zone comprises a liquid hydrocarbon, a vaporized hydrocarbon, and a hydrogen-rich gas, and that this feed is introduced into the reaction zone at an elevated temperature. It is further known that the reactions which are encountered in this catalytic environment are exothermic, and that the temperature of the vapor phase and of the liquid hydrocarbon phase is increased due to the exothermic heat of reaction. In order to avoid excessive temperature within the catalyst bed it is typical to arrange the catalyst in a plurality of separate, super-imposed fixed beds so that diluent or quench vapors may be distributed between the beds during the reaction. The cool quench vapors, normally comprising hydrogen-rich gas, reduce the temperature of the effluent from the bed above before the liquid-vapor mixture of hydrocarbon and hydrogen is passed to the bed of catalyst below.

It is typical in the art to support each individual bed of catalyst upon a perforated support plate. It is also typical in the art to introduce the quench hydrogen between the fixed beds of catalyst by means of a perforated pipe grid or other means which is positioned throughout the cross-section of the reactor vessel at the quench point. The effluent from the catalyst bed above thus rains down from the perforated support plate throughout the cross-sectional area of the reactor while the quench hydrogen is distributed by the perforated grid throughout the cross-sectional area of the reactor.

This prior art type of fluid distributing apparatus comprising a perforated catalyst support plate and a hydrogen quench grid distributor, is utilized with the intent of achieving a complete distribution of liquid and gas phases, as uniformly as possible, throughout the cross-sectional area of the reactor vessel and of the catalyst bed below. It is also the purpose of this typical fluid distributing apparatus to provide an intimate contact between hot effluent from the bed above and cool quench in order to achieve a uniform temperature of the constituents that pass to the bed below.

However, this typical prior art design has proven to be relatively ineffective in completely accomplishing these objectives. The problem is complicated by the fact that it is normal to add a relatively small amount of cool quench hydrogen to a large quantity of hot effluent comprising hydrocarbon and hydrogen which is leaving the bed above at an elevated temperature. The problem is additionally complicated by the fact that the amount of cold quench material is relatively small in relation to the large cross-sectional area across which it must be distributed in order to maintain a proper uniform distribution of liquid and vapor to the bed of catalyst below.

Further, because there is a mixed-phase condition within the reactor itself, the heavier viscous liquids tend to channel down the side of the reactor whereas the less viscous liquids tend to channel in the central region of the catalyst bed with the vaporized hydrocarbon and hydrogen. The result is that the temperature encountered within the catalyst bed will be quite uneven and localized undesirable hot spots are often found in each bed. It is well known by those skilled in the art that the existence of hot spots within the catalyst bed leads to undesired indiscriminate or non-selective hydrocracking of the hydrocarbon constituents.

Since the more viscous liquid tends to rain down through the support plate near the walls of the reactor, these viscous materials will also continue to channel along the walls in the beds below. This results in an ineffective quench between the beds, and the resulting continuation of liquid channeling produces further danger of localized hot spots in the lower catalyst beds.

SUMMARY OF THE INVENTION

It is, therefore, an object of the present invention to provide an improved method for contacting two fluids in a fluid-solids contacting zone such as an adsorption zone or a reaction zone. It is another object of this invention to provide an improved method for contacting and distributing mixed phases of vapor and liquid in such contacting zones. It is a further object of this invention to provide a fluid distribution method whereby greatly improved contact of vapor and liquid phases occurs at their point of introduction into a solid contacting zone. It is a still further object of this invention to provide a method for improved heat exchange between a liquid phase and a vapor phase passing to a fluid-solids contacting zone in a uniformly distributed manner at a substantially uniform temperature.

These and other objectives and the advantages of the present invention will become more readily apparent to those skilled in the art as the summary of the invention is more fully set forth hereinafter.

In the present invention, these objectives can be achieved by the use of a novel combination catalyst support and effluent redistribution apparatus wherein there is incorporated a novel means for injecting the quench hydrogen into the effluent which passes from a catalyst bed above to a catalyst bed below.

One embodiment of the apparatus that may be used in the method of this invention is clearly set forth in FIG. 1 wherein there is illustrated a partially cut-away elevational view of a typical hydrocracking reactor vessel containing a plurality of catalyst beds supported upon a novel catalyst support and fluid distribution apparatus.

FIGS. 2 and 3 comprise sectional elevational views of the catalyst support and fluid distribution apparatus wherein the elements comprising the apparatus are clearly set forth with particularlity. These two embodiments comprise the inventive apparatus in a most simplified combination of the elements.

FIGS. 4 through 6 comprise a particularly preferred embodiment of the fluid distribution and contacting apparatus. FIG. 4 is a sectional elevational view of the apparatus while FIGS. 5 and 6 comprise sectional plan views of the apapratus shown in FIG. 4.

FIGS. 7 and 8A through 8C illustrate a preferred embodiment of the catalyst support plate which comprises one element of the fluid distributing apparatus.

FIGS. 9A through 9D comprise simplified schematic flow diagrams which illustrate the manner in which the inventive fluid distribution and contacting may be operated.

In one preferred embodiment of the present invention as applied to a downflow catalytic reaction zone, the fluid distribution and contacting apparatus comprises a catalyst support plate for holding and retaining the catalyst bed above. The support plate comprises a perforated annular section surrounding and encompassing a substantially imperforate center section. Attached below the perforate annular section of the catalyst support plate is a first annular chamber containing a plurality of fluid openings in the inner annular chamber wall. It is preferred that this section be free of any particulate solids. Attached below the substantially imperforate center section of the catalyst support plate is a substantially confined central chamber having a plurality of fluid openings in the chamber wall. The annular chamber encompasses the central chamber and is spaced apart therefrom in a manner sufficient to provide an annular space between the chambers. Below the central chamber is a second chamber communicating with the annular space between the central chamber and the first annular chamber.

In operation of the inventive catalyst support and fluid distribution apparatus of the present invention in a downflow reaction zone, the effluent from the catalyst bed above passes through the perforated annular section of the catalyst support plate and into the solids free first annular chamber below. The relative absence of solids in this chamber is preferred to enhance the mixing of fluids descending from various portions of the bed. Quench hydrogen is introduced by conduit means into the central chamber attached below the imperforate center section of the catalyst support plate. The hot effluent is discharged into the annular space via the fluid openings contained in the inner annular wall of the annular chamber. Simultaneously, the quench hydrogen is discharged into the annular space via the fluid openings in the chamber wall of the central chamber. Preferably, the effluent discharged and the quench hydrogen discharged impinge upon one another axially in order to produce a region of high turbulence within the annular space and thereby produces a homogeneous mixture of substantially uniform temperature. The mixture of quench hydrogen and cooled effluent then passes from the annular space into a second chamber below for further mixing and then is discharged via fluid openings in the chamber wall to the catalyst bed below.

In summary, therefore, one broad embodiment of the present invention may be characterized as a method for contacting two fluids in a fluid-solids contacting zone which comprises, passing a first fluid into a solids free annular chamber having a plurality of first fluid openings in the inner annular wall of the chamber; passing a second fluid into a first central chamber having a plurality of second fluid openings in the chamber wall and superjacent to a second central chamber also having a plurality of openings in the chamber wall; discharging the first fluid from the first fluid openings into an annular space between the annular chamber and the central chamber; discharging the second fluid from the second fluid openings into the annular space and substantially axially and directly into the first fluid whereby a mixture of first and second fluids is produced; passing the mixture from the annular space into the second chamber for further mixing; and discharging the mixed fluids through the fluid openings in the second chamber on to a bed of particulated solids.

In addition, the method of the present invention may be broadly characterized as utilizing a fluid contacting means which comprises in combination, a first central chamber and a superjacent second chamber communicating with the first central chamber, with each chamber having a plurality of fluid openings spaced in each chamber wall; an annular chamber spaced around and apart from the central chamber, having a plurality of second fluid openings spaced in the inner annular wall of the annular chamber; means for attaching the central chamber to the annular chamber in a manner sufficient to provide between the chambers, an annular space having communication with the first and second fluid openings, and having one closed end and one open; a first fluid passageway communicating with the central chamber; and a second fluid passageway communicating with the annular chamber.

A clear understanding of the present invention may now be obtained by referring to the accompanying figures.

DESCRIPTION OF THE FIGURES

As noted hereinabove, one particularly preferred embodiment wherein the method of the present invention finds application is in exothermic hydrocarbon conversion processing over particulated conversion catalyst. For illustrative purposes the drawing of FIG. 1 shows an embodiment of the invention wherein a hydrocarbon fraction is hydrocracked in the presence of hydrogen over a suitable hydrocracking catalyst.

Figure 1:
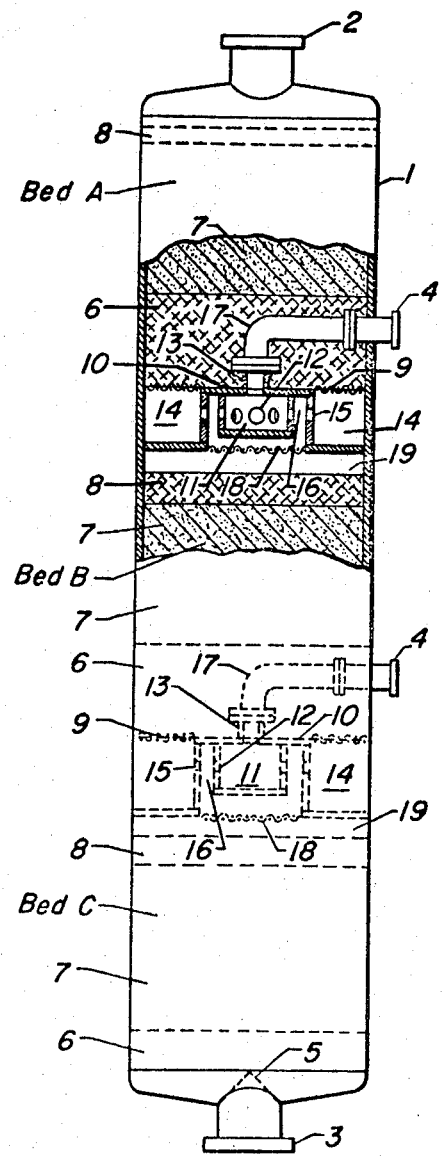
FIG. 1 shows a simplified partially cut-away elevational view of a hydrocracking reactor vessel comprising a vertically elongated shell 1 having a fluid inlet nozzle 2 at the top of the shell and a fluid outlet nozzle 3 at the bottom of the shell. Reactor vessel 1 contains three catalyst beds, beds A through C, supported upon the inventive catalyst support and fluid distribution apparatus. Attached to the reactor shell 1 there are also provided hydrogen quench ports 4. At the bottom of reactor shell 1 and covering the fluid opening 3 is a screen device 5 which supports the bottom catalyst bed, bed C.

The catalyst beds contain a typical hydrocracking catalyst which may be present in pilled, spherical or extruded form. The particulated catalyst particles 7 are supported upon a layer of inert support material 6. The support material 6 may comprise ceramic balls, Berl saddles, Raschig rings or any other inert packing material which is typically used in hydrocarbon conversion reactors for supporting beds of particulated catalyst. In addition, each bed contains a similar layer of inert support materials 8 at the top of the catalyst particles 7. This upper layer of inert support material is used as a means for holding down the low density particles of catalyst 7 in case of pressure fluctuations, and for enhancing distribution of fluids which enter at the top of each bed.

Each entire upper catalyst bed (beds A and B) comprising catalyst particles 7, lower support layer 6, and covering layer 8 is supported upon a catalyst support plate member or deck which comprises a perforated annular section 9 encompassing a substantially imperforate center section 10. For illustrative purposes, perforated annular section 9 is shown as a woven screen section. Attached below the imperforate center section 10 is a central chamber 11 having a plurality of fluid openings 12 in the vertical wall. Centrally disposed in the imperforate center section 10 is a fluid inlet port 13 which provides for the flow of quench hydrogen into the central chamber 11 from hydrogen quench nozzle 4 via conduit means 17.

Attached to the catalyst support plate member is an annular chamber 14 which comprises as its upper chamber wall the perforated annular section 9 of the catalyst support plate. Annular chamber 14 contains a plurality of fluid openings 15 in the inner annular wall of the chamber. Annular chamber 14 encompasses central chamber 11 and is spaced apart therefrom in a manner sufficient to provide an annular space 16 betwen the chambers. Attached to the annular chamber below the central chamber 11 and below the annular space 16 is a perforated means 18.

In the typical hydrocracking process, a feed comprising liquid hydrocarbon, vaporized hydrocarbon and a hydrogen rich gas enters the reactor vessel 1 via inlet nozzle 2. This feed mixture passes through the first catalyst bed A and is increased in temperature due to the hydrocracking reaction which occurs therein. As the feed and resulting effluent pass through catalyst bed A, the vapor portion will typically tend to flow down the central region of the catalyst bed while the liquid portion will tend to channel down the reactor walls and along the outer regions of the catalyst bed. The liquid and vapor portions, upon passing through the catalyst bed, enter the annular chamber 14 through the fluid passageway which is provided by the perforated annular section 9 of the catalyst support plate. Annular chamber 14 provides a reservoir within which channeling liquids may be remixed to provide a relatively homogeneous liquid hydrocarbon phase and to eliminate the concentration effects which occur due to the channeling of liquid in the catalyst bed above. Therefore, as illustrated, it is preferred that chamber 14 be relatively free of solids. The hot effluent comprising liquid hydrocarbon, vaporized hydrocarbon and hydrogen-rich gas is discharged from the annular chamber 14 into the annular space 16 via fluid openings 15.

Simultaneously, quench hydrogen enters the reactor via hydrogen ports 4 and passes into the central chamber 11 via conduit means 17 and inlet port 13. The cool quench hydrogen is discharged into the annular space 16 via fluid openings 12. Preferably, fluid openings 12 are in substantially axial radial alignment with fluid openings 15 so that the hydrogen quench discharge passes directly into the hot effluent discharge to provide a region of high turbulence within annular space 16. The resulting mixture of effluent and quench hydrogen leaves the annular space 16 at a substantially uniform temperature and passes through perforated means 18 into the catalyst bed B below. Perforated means 18 is provided below annular space 16 in order to provide an additional means of redistributing the resulting mixture in a more substantially uniform pattern as it falls through space 19 into the catalyst bed B below.

The mixture passes through bed B and is elevated in temperature by additional hydrocracking reaction. The resulting effluent comprising liquid and vapor is quenched with additional cool hydrogen in the catalyst support and fluid distributing or contacting apparatus which is positioned below and supports catalyst bed B. The resulting mixture of quench hydrogen and effluent liquids and vapors passes from the fluid distribution and contacting apparatus into catalyst bed C at a substantially uniform temperature and in a substantially uniform distribution. Additional hydrocracking reaction occurs in catalyst bed C and the total final mixture of hydrocarbon liquid, hydrocarbon vapor, and hydrogen-rich gas passes out of the reactor via support means 5 and fluid outlet port 3. The effluent is then separated in a manner that is well known to those skilled in the art for recovery of the desired hydrocarbon products.

Figure 2:
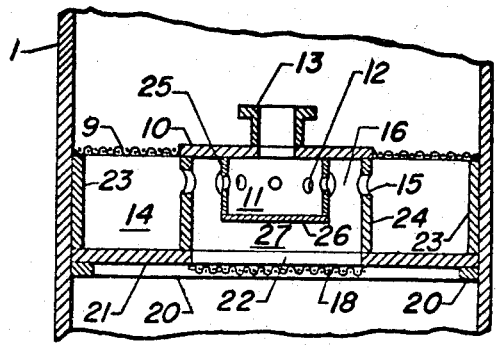

FIG. 2 illustrates typical elements comprising the catalyst suport and fluid distribution or contacting apparatus of FIG. 1 as shown in vertical section. Referring now to FIG. 2, there is shown a portion of the reactor shell 1 and attached thereto a support ring 20 for holding and retaining the apparatus. For ease in discussion, the catalyst bed above is not shown in the drawing. Supported upon support ring 20 is a lower support plate 21 having a central hole 22. Support plate 21 thus has an annular configuration and provides the floor or bottom wall for the annular chamber 14. Rising vertically above support plate 21 and adjacent to the reaction shell 1 is a support skirt 23. This support skirt 23 provides the outer annular wall of the annular chamber 14. Also rising above support plate 21 adjacent to the central hole 22 is the inner annular wall 24 of the annular chamber 14. The inner annular wall 24 contains a plurality of fluid openings 15 which provide communication of the annular chamber 14 with the annular space 16.

The upper support plate member or deck of the inventive apparatus, as noted hereinabove during the discussion of FIG. 1, comprises a perforated annular section 9 and a substantially imperforate center 10. The perforated annular section 9 provides the roof or top wall of annular chamber 14 and simultaneously provides the means or passageway for the flow of effluent from the catalyst bed above (not shown) to the annular chamber 14.

Attached to the bottom of the imperforate center section 10 is a central chamber 11 formed by the vertical wall 25 and a bottom wall 26 attached thereto. The wall of the central chamber 25 contains a plurality of fluid openings 12 which provide communication of the central chamber with the annular space 16. The center of the imperforate section of the upper support plate contains the fluid port 13 which provides an inlet means for the introduction of quench hydrogen as noted in the discussion relative to FIG. 1.

In the embodiment shown in FIG. 2, in addition to the annular space 16 between the ecntral chamber 11 and the annular chamber 14, there is provided a space 27 located below the central chamber and above the perforated means 18 which covers the hole 22 in the lower support plate 21. The space 27 and perforated means 18 enhance the redistribution of fluids which pass out of the annular space 16 so that the vapor-liquid mixture flowing through the perforated means 18 is more uniformly distributed on the upper surface of the catalyst bed below.

While the preferred embodiment of FIG. 2 comprises the circular perforated means 18 below the central chamber 11, a further embodiment of the apparatus of FIG. 2 may be provided. In this alternate embodiment, the central chamber 11 would be extended downwardly so that the bottom plate 26 thereof would be on the same plane as the lower support plate 21. This then would provide that the lower space 27 would be eliminated and that the annular space 16 would extend all the way to opening 22 in lower support plate 21. The perforated means 18, therefore, would be an annular perforated means and not necessarily a circular perforated means.

Figure 3:
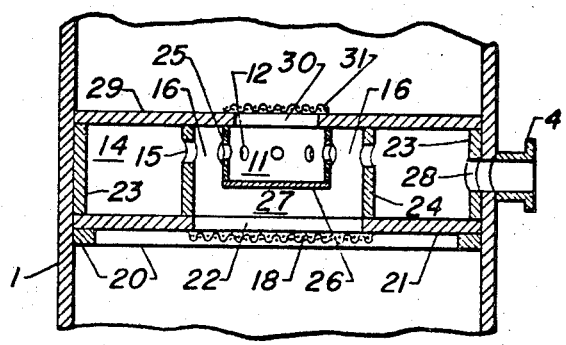

A further embodiment of the apparatus shown in FIG. 2 is provided by changing the hydrogen quench passageway from the central chamber to the anular chamber as illustrated in sectional elevation in FIG. 3. The elements of FIG. 2 are again repeated in the construction of the apparatus shown in FIG. 3, with several modifications, however. By comparing FIGS. 2 and 3, it will be seen that in the embodiment of FIG. 3, the hydrogen quench nozzle 4 is in communication with the annular chamber 14 by means of a fluid opening 28 which is provided in the wall of the reactor shell 1 and in the support skirt 23 which forms the outer wall of the annular chamber 14. In addition, the upper support plate member or deck which holds and retains the catalyst bed, not shown, comprises an imperforate annular section 29 encompassing a perforated center section which comprises a hole 30 in the support plate 29 and a perforate means 31 covering this hole.

The apparatus disclosed in FIG. 3 will function in the manner which has been set forth hereinabove in discussing FIG. 1, notwithstanding that the apparatus of FIG. 3 provides for the effluent to pass into the central chamber 11 while the hydrogen quench passes into the annular chamber 14. In the embodiment of FIG. 3 the effluent will pass into the annular space 16 via fluid openings 12 while the quench hydrogen passes into the annular space 16 via fluid openings 15. The two fluids meet in the annular space 16 to create a zone of turbulence wherein they are thoroughly mixed. The mixture is then discharged downwardly from the annular space 16 to the catalyst bed below via opening 22 and perforated means 18.

In the embodiments shown in FIGS. 1 through 3, it is preferred that the central chamber 11 have a cylindrical configuration. It is also preferred that the plurality of fluid openings 12 be radially spaced in a substantially uniform manner in the cylindrical wall 25. The fluid openings 12 may be oriented so that discharging fluid passes through the openings 12 and impinges on the wall 24 of the annular chamber in a manner sufficient to provide turbulence within the annular space 26. Additionally, the fluid openings 15 preferably are radially spaced in a substantially uniform manner in the inner annular wall 24 of the annular chamber 14. Fluid openings 15 may be oriented in a manner sufficient to provide that the discharging fluid will impinge upon the wall 25 of the central chamber 11 in a manner sufficient to provide turbulence within the annular space 16. However, it is a preferred embodiment that the fluid openings 12 and 15 be equal in number and in substantially axial radial alignment in order that the discharging fluid passing through opening 12 impinges upon the discharging fluid passing through opening 15 so that the two fluids are given a most direct and forceful mixing effect within the annular space 16.

Figure 4:
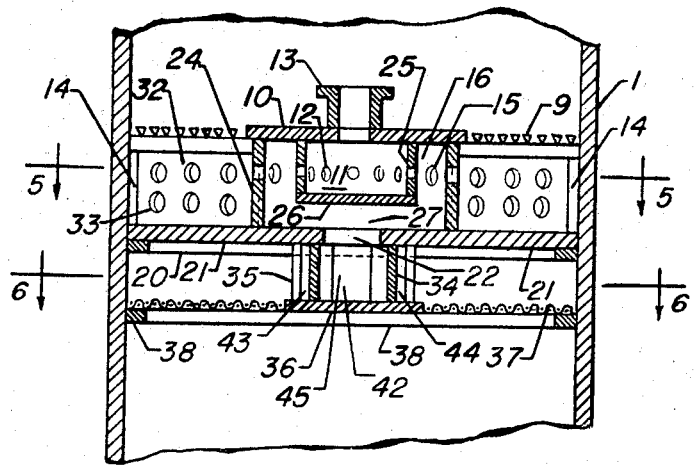
Figure 5:
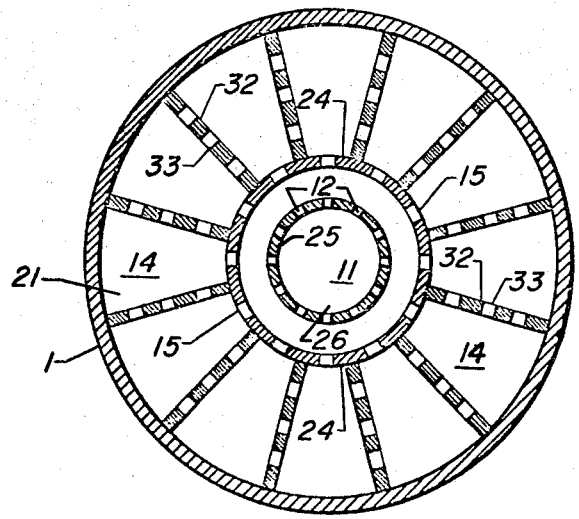
Figure 6:
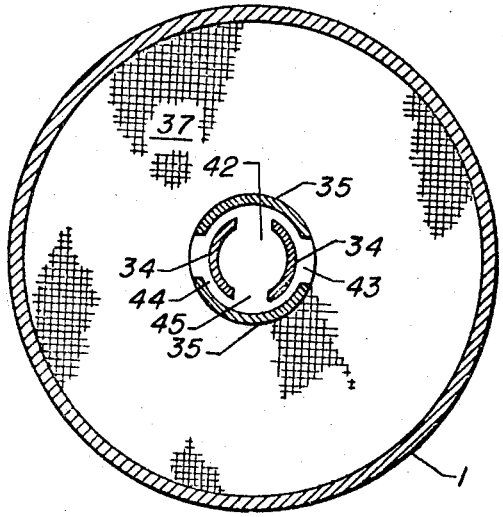

The fluid distributing or contacting apparatus which has been illustrated in FIGS. 2 and 3 comprises only two embodiments of the present invention. In FIGS. 4 through 6 there is shown a particularly preferred embodiment of the apparatus as applied to a large diameter fluid contacting vessel. FIG. 4 provides a sectional elevational view of this alternate preferred embodiment. FIGS. 5 and 6 provide sectional plan views of the alternate embodiment of FIG. 4.

Referring now to FIG. 4 there is shown a portion of the vertically elongated shell 1 and the support ring 20. The lower support plate 21 having a central opening 22 is held upon this support ring 20. The support skirt 23 which was provided in the embodiments of FIGS. 2 and 3 is not so provided in this embodiment, and the required support of the upper plate or deck retaining the catalyst bed is provided by bearing beam members in a manner disclosed hereinafter. However, there is shown the inner annular wall 24 of the solids free annular chamber 14. The inner annular wall 24 supports the center imperforate section 10. The imperforate section 10 has the fluid inlet port 13 centrally disposed therein. Below the imperforate section 10 is the central chamber 11 comprising the chamber wall 25 and the chamber bottom plate 26. The chamber wall 25 contains the plurality of fluid openings 12.

Extending radially from the inner annular chamber wall 24 to the reactor shell 1 is a plurality of support beam members 32 which divide annular chamber 14 into a plurality of annular sectors. Each support beam member 32 preferably contains a plurality of fluid openings 33 in order that the annular sectors formed by the support beam members 32 are in fluid communication with each other. Beam members 32 are shown as having a plate configuration, but they may have any cross-sectional shape such as an angle, T, channel, I-beam, or other configuration. The support beam members 32 support the perforated annular section 9 of the upper support plate member or deck which retains and holds the catalyst bed above. The perforated annular section 9 has a preferred construction to be disclosed in FIGS. 7 and 8A through 8C hereinafter.

FIG. 5 provides a sectional plan view of the inventive fluid distributing and contacting apparatus of FIG. 4 as taken along line 5—5. In FIG. 5, there is shown the reactor shell 1 and the inner annular wall 24 of the annular chamber 14. There is also shown the cylindrical wall 25 of the central chamber 11. The inner annular wall 24 contains the plurality of fluid openings 15 which are disposed therein in a substantially axially radial alignment with the plurality of fluid openings 12 in the wall 25 of central chamber 11. FIG. 5 also shows the annular space 16 which is provided between the two chambers, as well as lower support plate 21 and the bottom plate 26.

It will be seen clearly in FIG. 5 that the annular chamber 14 is divided into a plurality of annular sectors by the bearing beam members 32. It is also apparent that each annular sector contains one fluid opening 15, although those skilled in the art realize that more than one fluid opening 15 may be provided in any annular sector. There is also shown in FIG. 5 the plurality of fluid openings 33 within each support beam member 32. Thus, it is readily ascertainable to those skilled in the art that the annular chamber 14 is divided into a plurality of annular sectors by the support beam members 32 which support the perforated annular section 9 of the upper support plate.

It is further apparent from FIGS. 4 and 5 that the annular sectors of annular chamber 14 are in fluid communication with each other by means of the fluid openings 33 in the support beam members 32. Thus, if effluent channeling down from the catalyst bed above does so in a manner which causes liquid to be concentrated in one area of the annular chamber, this concentrated liquid will be redistributed to the adjacent annular sectors of the annular chamber 14 via fluid openings 33. It is thus preferred that annular chamber 14 be solids free since the presence of solids would hinder the mixing of fluids entering chamber 14 at diametrically opposite points on the perimeter of column 1. Fluid openings 33 thus provide for a more uniform distribution of effluent liquids which are thereafter discharged from the annular chamber 14 into the annular space 16.

Referring now again to FIG. 4, there is shown the annular space 16 between the annular chamber 14 and the central chamber 11. There is additionally shown the open space 27 below the central chamber 11 and above the fluid opening 22 in the lower support plate 20. It will be seen in FIG. 4 that the annular configuration of the imperforate lower support plate 21 is such as to provide a baffling effect to the flow of fluids within annular space 16 and open space 27. The diameter of the fluid opening 22 in the lower support plate 21 is smaller than the diameter of the central chamber 11. Therefore, the fluid mixture flowing downwardly from the annular space 16 is baffled horizontally to the center for subsequent downward passage through the fluid opening 22 and thereby given a further mixing effect. Below the lower support plate 21 there is provided a further series of vertical baffles 34 and 35 confined between the lower support plate 21 and a bottom baffle plate 36. Vertical baffles 34 form chamber 42 and are attached via support plate 21 to annular chamber 14. Within chamber 42 the fluids previously mixed in annular space 16 enter via fluid opening 22 and are further mixed before being discharged via vertical slot openings 43 formed by baffles 35. As illustrated in FIGS. 4 and 6, vertical baffles 34 are formed by a conduit having a pair of continuous vertical slots 45 in the conduit wall parallel to the axis of the conduit. Similarly, baffles 35 are also formed by a conduit which is spaced around and apart from baffles 35 and form annular space 44. Preferably, slot openings 43 and 45 are disaligned to enhance fluid mixing. Annular space 44 is closed at the top by support plate 21 and at the bottom by baffle plate 36. Attached to the baffle plate 36 is an annular perforate section 37 supported upon a support ring 38 attached to the reactor shell 1.

Referring now to FIG. 6, there is shown a sectional plan view of the apparatus of FIG. 4 taken along the line 6—6 in order to more clearly show the construction of the baffles below fluid opening 22 and how they relate to form chamber 42. In FIG. 6, there is shown the reactor shell 1 and the bottom baffle plate 36. Confined between the reactor shell 1 and the bottom baffle plate 36 is the annular perforate section 37. From FIG. 6, it will be seen that the vertical baffles 34 and 35 formed by slots 43 and 45 in the described two conduit means between the lower support plate 21 and the bottom baffle plate 36 have a relatively concentric semi-circular configuration. The pair of outer baffles 35 formed along the outer periphery of bottom baffle plate 36, have an opening 43 between each end of the baffles 35. Contained within formed outer baffles 35 is a pair of formed inner baffles 34 oriented to give a fluid opening 45 between the ends of baffles 34 which is 90° from the fluid opening 43 between the ends of the outer baffles 35. Thus, fluid passing downwardly from fluid opening 22 above into chamber 42 impinges upon the bottom baffle plate 36 and is conducted horizontally through the openings 45 between the ends of baffles 34. The fluid then passes circumferentially between baffles 34 and 35 through annular space 44 and is then discharged from the opening 43 between the ends of baffles 35. The passage of the fluids in the confined annular path 44, between baffles 34 and 35, provides added mixing due to the turbulence therein. The discharged fluids comprising, in the illustrative example of FIG. 1, liquid hydrocarbon, vaporized hydrocarbon, and hydrogen gas, is then distributed by means of perforated annular section 37 to the catalyst bed below, not shown, in a substantially uniform manner throughout the entire cross-section of the bed. The perforations in section 37 develop a pressure differential across the section and insure that the liquid and vapor are uniformly distributed across the cross-section of the reactor.

As noted hereinabove, the inventive catalyst support and fluid contacting apparatus illustrated in FIGS. 4 through 6 has particular utility in contacting vessels of large diameter. The support beam members 33 are radially disposed in order to support perforated annular section 9, and in order to give structural strength to the contacting apparatus. Those skilled in the art will ascertain that the outer support skirt 23, which was shown in FIGS. 2 and 3, could additionally be employed in this preferred embodiment. The sequence of baffles which is provided in the embodiment shown in FIGS. 4 and 6, and the annular perforate section 37 are provided in order to give increased turbulence and mixing of the fluids before they are redistributed across a large cross-sectional area in a large diameter contacting vessel. The annular perforate section 37 is provided in order to maintain a sufficient pressure drop so that the fluid mixture will be distributed across the entire cross-sectional area of the reactor and not concentrated in the center as could otherwise occur without perforate means 37.

FIGS. 7 and 8A through 8C illustrate a preferred embodiment for the perforated annular section 9 of FIGS. 1, 2 and 4, and for the perforated center section 31 of FIG. 3. The perforate sections which have been illustrated in the figures are shown as woven screen means, with the exception of FIG. 4 wherein there is shown a special construction for the perforated annular section 9. This preferred construction for the annular section 9 and for the center section 31 comprises a perforated section constructed by spacing a plurality of longitudinal rod members transversely upon bearing rod members sufficient to provide a plurality of slot openings.

Figure 7:
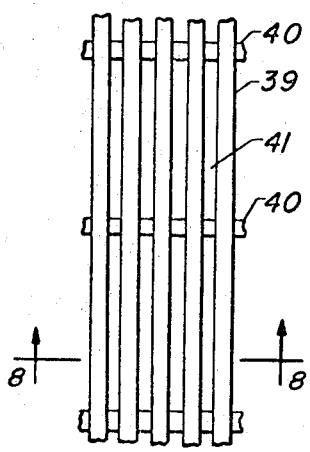

Referring now to FIG. 7, there is shown in plan view a portion of the perforated annular section 9 of FIG. 4. A plurality of longitudinal rod members 39 are supported upon and attached to a plurality of bearing rod members 40 in a manner sufficient to provide a slot opening 41 between adjacent longitudinal rod members 39. The longitudinal rod members 39 are spaced a finite distance apart so that slot opening 41 will pass fluids while retaining particulated contact solids of the size normally employed in a catalytic reactor bed. While FIG. 7 shows the longitudinal rod members 39 aligned perpendicular to the bearing rod members, those skilled in the art will realize that the bearing rod members 40 could have a radial alignment so that the longitudinal rod member 39 would be attached transversely to the bearing rod member 40, but not perpendicular thereto.

Figure 8A:
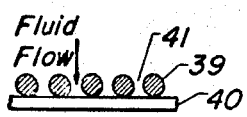
Figure 8B:
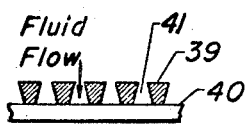
Figure 8C:
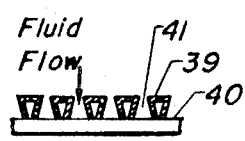

FIGS. 8A through 8C illustrate sectional views of the perforated section 9 illustrated in FIG. 7 taken along the section line 8—8. In FIG. 8A, there is shown a bearing rod member 40 supporting a plurality of longtiudinal rod members 39. The adjacent longitudinal rod members 39 have a circular cross-sectional area in FIG. 8A. Thus, it may be noted that the cross-section of the resulting slot opening 41 has a converging configuration in the direction of fluid flow so that the slot becomes narrower at the diameter of the adjacent rod members 39. Thus, any particulated solid such as catalyst fines may become lodged in the slot 41 and blind a portion of the perforated section 9 (or 31).

It is, therefore, a preferred embodiment that the longitudinal rod member 39 have a triangular or wedged-shape cross-section as shown in FIGS. 8B and 8C. By having the wider portion of the wedged-shape cross-section of the rod member 39 along the outer surfaces of the perforated section 9 or 31, the slot opening 41 is thereby provided with an increasing size fluid passageway for the flow of fluid, and once any entrained particulated matter such as catalyst fines passes into the slot opening 41, it can more readily pass downwardly and into the chamber below. It will be seen in FIGS. 8B and 8C that the slot opening 41 also results in a triangular or wedged-shape cross-section for this fluid passageway with the widest portion of the wedged-shaped slot opening towards the inside surfaces of the perforated section. Thus, by employing the triangular or wedged-shape cross-section configuration for rod member 39, the perforated section 9 or 31 is a "self-cleaning type screen section" since retention of the solids and blinding of the screen is minimized.

FIG. 8B specifically illustrates the cross-sectional area of a longitudinal rod member 39 having a solid trapezoidal shape. FIG. 8C illustrates a channel type cross-section wherein the open end of the channel is narrower than the flange end of the channel thereby providing the desired wedge-shape. For screens of the general type shown in FIGS. 8B and 8C, reference may be made to U.S. Pats. 2,046,456; 2,046,457; 2,046,458; and 3,101,526.

FIGS. 9A through 9D comprise simplified schematic flow diagrams disclosing the manner of operation for the illustrated fluid distribution and contacting apparatus. For brevity, FIGS. 9A through 9D indicate the manner of operation for the apparatus as embodied in FIGS. 1, 2 and 4, although the teachings are equally pertinent to the preferred manner of operation for the embodiment in FIG. 3.

Figure 9A:
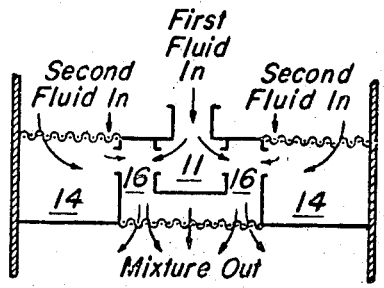

FIG. 9A discloses a contacting method utilizing the appaartus of FIG. 2 wherein the first fluid is passed downwardly into the central chamber 11 and the second fluid is passed downwardly into the annular chamber 14. The two fluids then pass through the respective fluid openings and into the annular space 16, wherein intimate contacting and mixing occurs. A resulting mixture then passes downwardly from the annular space and into the space below. This is the preferred downflow method of operation which has been previously disclosed hereinabove.

Figure 9B:
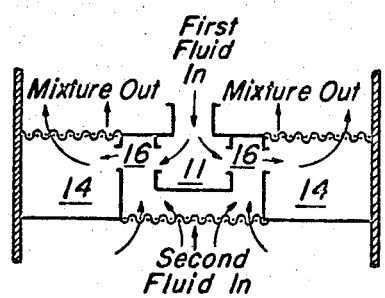

FIG. 9B illustrates the operation of the inventive apparatus of FIG. 2 in an upflow manner. There is shown in FIG. 9B the first fluid passing downwardly into the central chamber 11 while the second fluid passes upwardly into the annular space 16 from the space below the inventive contacting apparatus. The first fluid is passed through the fluid opening of the central chamber wall and into the annular space 16 wherein first and second fluid are intimately contacted and mixed. The resulting mixture then passes through the fluid openings of the inner annular wall of the annular chamber 14 and then out of the annular chamber in an upflow manner.

Those skilled in the art will readily ascertain that the inventive fluid contacting and distributing apparatus of the present invention will also function upflow and downflow if the embodiments of the apparatus are inverted. Thus, for example, FIGS. 9C and 9D indicate the inventive apparatus illustrated in FIG. 2 wherein the apparatus has been turned upside down.

Figure 9C:
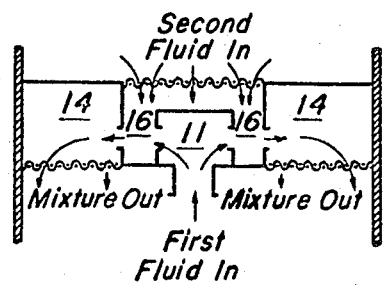

Referring now to FIG. 9C for downflow operation, the first fluid is passed into the central chamber 11 upwardly while the second fluid is passed downwardly into the annular space 16 from the space above the apparatus. The first fluid passes from the fluid openings of the central chamber wall into the annular space 16 where it intimately contacts the second fluid to produce a substantially homogeneous mixture. The resulting mixture passes into the annular chamber 14 via the fluid openings in the inner annular chamber wall of chamber 14. The mixture then passes downwardly through the perforated means and is discharged from the annular chamber.

Figure 9D:
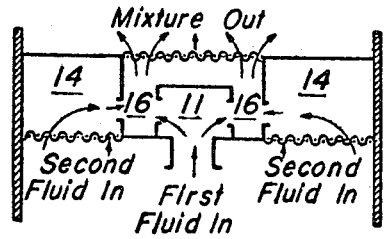

Referring now to FIG. 9D, there is shown the operation of the inventive apparatus oriented in an upside down position for upflow fluid processing. In FIG. 9D, there is shown the first fluid passing into the central chamber 11 in an upflow manner while the second fluid passes into the annular chamber 14 in an upflow manner. The first and second fluids are discharged through their respective fluid openings in the chamber walls into the annular space 16 wherein they are intimately contacted to produce a substantially homogeneous mixture. The mixture then passes upflow from the annular space and is discharged from the apparatus in the manner illustrated.

In comparing the operations which have been set forth in FIGS. 9A through 9D as simplified flow diagram, those skilled in the art will perceive that the inventive fluid contacting apparatus may also be operated backwards. That is to say, that the first fluid could be passed into the annular chamber 14 while the second fluid was passed into the annular space. The first fluid would then be discharged into the annular space for mixing with the second fluid. The mixture would then pass into the central chamber 11 via the fluid openings in the chamber wall thereof. The mixture would then pass out of the central chamber and could be withdrawn by a conduit means or passed into a contacting system, not shown. Thus, in effect, the apparatus would be functioning backwards since the central chamber would be an outlet passageway and not an inlet passageway. However, this embodiment has not been illustrated by schematic diagram herein, since it is not a particularly preferred manner of operation.

The method of operation of the fluid contacting and fluid distributing means described is readily ascertainable to those skilled in the art from the teachings which have been presented hereinabove. In addition, the advantages to be accrued from the inventive apparatus are equally apparent from the foregoing disclosure.

It must be realized, however, that the effectiveness of the apparatus and the contacting method will depend upon the specific environment in which the invention is utilized and in the specific dimensional design of the fluid distributing and contacting apparatus as it is specifically employed.

Those skilled in the art relize that for optimum operation, a high pressure drop is necessary in order to provide maximum turbulence resulting in optimum mixing and redistribution of the fluids. The high pressure drop may be produced by providing minimum diameters and a minimum number of the fluid openings 12 and 15. In addition, the high pressure drop may be produced by providing a minimum distance between wall 25 of the central chamber and wall 24 of the annular chamber.

While maximum pressure drop is desirable from a standpoint of optimum mixing and redistribtuion of the fluids, those skilled in the art will also realize that minimum pressure drop is desirable from a structural standpoint. Thus, if a high pressure drop is produced by the dimensional design of the inventive fluid contacting apparatus, a greater structural strength of the various elements of the apparatus must be provided in order to keep the inventive fluid contacting means from collapsing due to the pressure drop. Thus, the increased need for structural support requires a greater capital expense in fabricating the apparatus. In addition, those skilled in the art will realize that if a high pressure drop is provided in the apparatus, a greater compressor capacity is required in order to provide the hydrogen quench which has been illustrated as one of the fluids in the foregoing disclosure.

Thus, in summary a high pressure drop, while providing optimum contacting, mixing and redistribution of the fluids, will also result in a higher capital cost and in a higher utility cost in operating the apparatus in the manner disclosed. Those skilled in the art must, therefore, strike a balance between these competing considerations.

In addition, it has been noted that the fluid openings 12 may be oriented so that they are positioned opposite an imperforate section of the annular wall 24. Additionally, the fluid openings 15 may be positioned so that they are opposite an imperforate section of the central chamber wall 25. In such an embodiment then it is preferred that the distance between wall 24 and wall 25 be minimized in order that the discharged fluid streams may impinge upon the opposite wall with the greatest force in order to produce a maximum amount of turbulence in the annular space 16.

However, as noted hereinabove, the preferred embodiment comprises the apparatus wherein the fluid openings 12 and the fluid openings 15 are equal in number and in substantially axial radial alignment. In this embodiment, it is preferred that the distance between central chamber wall 25 and annular chamber wall 24 be minimized in order that the two fluid streams which are discharged from their respective fluid openings may axially impinge upon each other with a maximum of force, in order to provide optimum contacting and mixing of the fluids in the annular space 16.

Thus, the dimensions of the inventive fluid contacting and distributing apparatus, and the dimensions for the elements thereof cannot be set forth herein with great specificty since a great many factors will affect the pressure drop and thus the dimensions which are required in any specific environment. Among the factors to consider in a hydrocracking reactor, for example, are the rate of flow of the effluent from the catalyst bed above to the catalyst bed below as well as the rate of flow of the quench hydrogen. The distribution of the vapor and liquid phases of the effluent flowing from the bed above will also affect the dimensions which are required in the design of the inventive contacting apparatus, and the temperature and pressure of the effluent will have a pronounced effect upon the distribution of vapor and liquid phases. In addition, it must be realized that the temperature at which the quench hydrogen is introduced will also have a pronounced effect on the degree of thermal quench which is experienced and upon the pressure drop which will be produced. Finally, molecular weights of the two fluids must be considered and the density of the various vapor and liquid phases is a primary consideration in dimensionally sizing the contacting apparatus for optimum pressure drop in order to produce a substantially uniform mixing of the two fluid streams.

Those skilled in the art will readily ascertain that the factors and considerations which have been recited hereinabove are of equal importance in an upflow application of the apparatus as well as in a downflow application. Those skilled in the art can readily design the inventive apparatus for either upflow or downflow operation by utilizing the teachings that have been presented herein.

It will be noted that in the discussion above, the specific example comprises an illustration wherein a hydrocarbon was catalytically hydrocracked. It is well known to those skilled in the art that the catalyst will deteriorate as the operation proceeds so that catalyst activity and selectivity gradually becomes lower during the life of the catalyst. This then requires that the inlet temperature of the fluid entering via inlet port 2 be gradually increased over the life of the catalyst. This increase of temperature will cause a change in the vapor-liquid equilibrium of the effluent which is discharged from any given catalyst bed, thus causing a change in the hydraulics of the fluid distributing and contacting apparatus. In order to compensate for this change so that the effectiveness of mixing and quenching for the particular apparatus is not lost, those skilled in the art will perceive that the temperature of the quench hydrogen can be changed, or that the rate of the quench hydrogen can be changed sufficiently so that the hydraulic balance necessary for the most effective operation of the fluid contacting apparatus will remain in substantial equilibrium throughout the life of the catalyst.

While the embodiments disclosed hereinabove have been particularly directed to the catalytic reaction of hydrocarbons in a hydrogen atmosphere, the invention is not so limited. Those skilled in the art will perceive that the method of contacting two fluids in a fluid-solids contacting zone and the apparatus, therefor have equal application in any fluid solids contacting zone such as an adsorption zone as well as a reaction zone. Additionally, the apparatus is not limited to the support of fixed beds of particulated contact solids, but it can also find application, for example, as the feed distribution apparatus at the top of the first bed contained within a downflow contacting chamber or at the bottom of the first bed contained within an upflow contacting chamber.

The method and apparatus also is not limited to the specific fluids disclosed hereinabove relative to hydrocracking operation. Thus, the first fluid and the second fluid illustrated in FIGS. 9A through 9D could individually comprise a liquid phase, a vapor phase, or a mixture of liquid and vapor phase. Those skilled in the art will realize that the inventive apparatus may have application where both fluid streams are liquid phases such as in a contacting operation in an extraction zone. Additionally, while the downflow embodiments of the inventive apparatus and the fluid contacting method have preferred application to fixed beds of particulated solids, the upflow embodiments may be easily adapted to fixed beds, fluidized beds, or ebullient beds.

However, from the disclosure hereinabove, it will be readily apparent that the particularly preferred embodiment of the present invention comprises application of the appaartus and inventive contacting method wherein the fluid-solids contacting chamber is a downflow catalytic reaction zone for the processing of hydrocarbon constituents in the presence of hydrogen. Additionally, as noted hereinabove, specific application of the present invention is in downflow hydrogenation, hydrotreating, hydrocracking and hydrodealkylation reaction zones wherein a hydrogen stream is utilized for the thermal quench of reactant hydrocarbon between catalyst beds.

It will be apparent to those skilled in the art that in such preferred applications, the pressure wherein the inventive apparatus and contacting method are functional will be in the range of from 100 p.s.i.g. to 3000 p.s.i.g. For example, in the hydrogenation of benzene to produce cyclohexane, a pressure range of from 100 p.s.i.g. to 500 p.s.i.g. is normally utilized. In the hydrotreating of light hydrocarbon fractions such as gasoline or naphtha to saturate olefins and to remove sulfur, nitrogen, oxygen, metallic and other impurities, a pressure in the range of from 100 p.s.i.g. to 1000 p.s.i.g. is typically utilized. In the hydrotreating or hydrocracking of hydrocarbon fractions heavier than naphtha such as kerosines, gas oils, cycle oils, reduced crudes, etc., pressures in the range of from 100 p.s.i.g. to 3000 p.s.i.g. may be utilized. In the hydrodealkylation of alkylbenzenes to produce benzene, a pressure in the range of from 300 p.s.i.g. to 1000 p.s.i.g. is normally employed.

In addition, those skilled in the art will realize that for these processes the inventive apparatus and contacting method will be utilized at a temperature in the range of from 300° F. to 1500° F. For example, in the hydrogenation of benzene to produce cyclohexane, a temperature range of from 300° F. to 600° F. is normal. In the hydrotreating of light hydrocarbons such as gasoline or naphtha fractions, a temperature range of from 500° F. to 900° F. is typically utilized. In the hydrotreating or hydrocracking of hydrocarbon fractions heavier than naphtha, a temperature range of from 500° F. to 1000° F. may be employed. In the hydrodealkylation of alkyl benzenes to produce benzene, temperatures in the range of from 1000 to 1500° F. may be utilized.

In these hydrocarbon processes wherein the inventive apparatus and contacting method find particular utility, the beds of particulated or contact solids will normally comprise hydrocarbon conversion catalyst containing one or more metallic components selected from Group VI–B and Group VIII of the Periodic Table (Periodic Table, Handbook of Chemistry and Physics, 43d edition). These metallic components are typically supported on a refractory inorganic oxide having a pilled, spherical or extruded form although any granular or particulated form may be employed. Typical support materials of this type are alumina, silica, magnesia, zirconia, kieselguhr, diatomaceous earth, etc., either singly or in combination. A typical hydrogenation catalyst will comprise a Group VIII metal on the refractory inorganic oxide, and a preferred catalyst for hydrogenation of aromatic hydrocarbons comprises nickel on kieselguhr. A typical hydrotreating catalyst will contain silica and alumina and a Group VIII metal or a Group VI–B metal or a combination of metals thereof. One preferred hydrotreating catalyst comprises silica, alumina, nickel, molybdenum, and cobalt. A typical hydrocracking catalyst will contain at least one metallic component selected from the metals of Group VI–B and Group VIII such as platinum, palladium, nickel or molybdenum and a composite of silica-alumina. A typical catalyst for the hydrodealkylation of alkyl aromatics will comprise a Group VI–B metal such as chromium, molybdenum, or tungsten on the refractory inorganic oxide support material and one particularly preferred catalyst comprises chromium oxide on silica-alumina.

In summary, therefore, a particularly preferred embodiment of the present invention may be characterized as a method for contacting two fluids in a fluid-solids contacting zone which comprises passing first fluid at a first temperature into an annular chamber having a plurality of first fluid openings in the inner annular wall of the chamber; passing second fluid at a second temperature into a central chamber having a plurality of second fluid openings in the chamber wall; discharging the first fluid from the first fluid openings into an annular space between the annular chamber and the central chamber; and discharging the second fluid from the second fluid openings into the annular space whereby a mixture of first and second fluids is produced at a temperature intermediate to the first and second temperatures.

Furthermore, it may be summarized that a particularly preferred embodiment of the method of the present invention may be further characterized wherein the foregoing contacting zone comprises a catalytic reaction zone, the first fluid comprises a hydrocarbon—preferably a liquid, the second fluid comprises hydrogen, and the bed of particulated solids comprises one of the group consisting of a hydrogenation catalyst, a hydrotreating catalyst, a hydrocracking catalyst, and a hydrodealkylation catalyst. In particular, the hydrogen is at a temperature below that of the hydrocarbon liquid and the catalyst is a hydrocracking catalyst.

We claim as our invention:

1. A method for contacting two fluids in a fluid-solids contacting zone which comprises:
   (a) passing a first fluid into a solids-free, outer annular chamber having an inner annular wall with a plurality of first fluid openings therein;
   (b) passing a second fluid into a first central chamber, superjacent to a second central chamber, said first chamber having a chamber wall with a plurality of second fluid openings in substantially axial radial alignment with said first fluid openings therein and said second chamber having a chamber wall with a plurality of third fluid openings therein;
   (c) discharging said first fluid through said first fluid openings into an inner annular space between said outer annular chamber and said first central chamber;
   (d) discharging into said annular space, said second fluid through said second fluid openings substantially axially and directly into said first fluid discharge whereby a region of high turbulence produces a mixture of first and second fluids;
   (e) passing said mixture from said inner annular space into said second central chamber whereby said first and second mixture are further mixed; and
   (f) passing said further mixed fluids from said second chamber through said third fluid openings.

2. The method of claim 1 wherein said first fluid comprises a vapor and said second fluid comprises a liquid.

3. The method of claim 1 wherein said first fluid comprises a liquid and said second fluid comprises a vapor.

4. The method of claim 1 wherein said first fluid is at a first temperature and said second fluid is at a second temperature, and said mixture is discharged from said annular passageway at a temperature intermediate to said first and second temperature.

5. The method of claim 1 wherein said contacting zone comprises a catalytic reaction zone and said fluid mixture from step (f) is discharged to a bed of particulated solids comprising a hydrocarbon conversion catalyst.

6. The method of claim 5 wherein said catalyst comprises one of the group consisting of a hydrogenation catalyst, a hydrotreating catalyst, a hydrocracking catalyst, and a hydrodealkylation catalyst.

7. The method of claim 1 wherein said first fluid is a hydrocarbon liquid at a first temperature, said second fluid is hydrogen vapor at a second temperature below said first temperature, said contacting zone comprises a catalytic reaction zone, and said fluid mixture from step (f) is discharged to a bed of particulated solids comprises a hydrocracking catalyst.

8. The method of claim 1 wherein said mixture from step (f) is discharged into a perforated annular chamber section.

9. The method of claim 1 wherein said second chamber comprises a first conduit having said third fluid openings in the conduit wall.

10. The method of claim 9 wherein the resultant mixture discharged through said third openings is passed into a second conduit enclosing said first conduit and having a fourth fluid opening in the second conduit wall, thereby providing a second confined annular passageway between said conduits wherein said fluids are further mixed and then discharged through said fourth fluid opening.

11. The method of claim 10 wherein said third fluid opening and fourth fluid opening are disaligned.

References Cited
UNITED STATES PATENTS

| | | | |
|---|---|---|---|
| 3,433,600 | 3/1969 | Christensen et al. | 23—288 |
| 3,556,736 | 1/1971 | Boyd | 23—288 |
| 3,556,737 | 1/1971 | Boyd | 23—288 |

HERBERT LEVINE, Primary Examiner

U.S. Cl. X.R.

208—59, 108